United States Patent [19]
Jacobsen

[11] Patent Number: 5,640,994
[45] Date of Patent: Jun. 24, 1997

[54] LIQUID RESERVOIR

[75] Inventor: Finn Jacobsen, Hammarö, Sweden

[73] Assignee: Kvaerner Pulping Technologies Aktiebolag, Sweden

[21] Appl. No.: 582,803

[22] Filed: Jan. 4, 1996

Related U.S. Application Data

[63] Continuation of Ser. No. 232,026, filed as PCT/SE92/00744, Oct. 28, 1992 published as WO93/09059, May 13, 1993.

[30] Foreign Application Priority Data

Nov. 6, 1991 [SE] Sweden ............................ 9103266

[51] Int. Cl.$^6$ .................................................. F03B 11/00
[52] U.S. Cl. ........................... 137/592; 137/432; 137/438; 137/587
[58] Field of Search ................................... 137/587, 592, 137/432, 438

[56] References Cited

U.S. PATENT DOCUMENTS

| 918,834 | 4/1909 | Fairall et al. | 137/578 |
|---|---|---|---|
| 2,940,467 | 6/1960 | Smith | 137/432 |
| 3,223,243 | 12/1965 | Miller | 137/578 |
| 3,296,776 | 1/1967 | Youngman | 55/165 |
| 4,023,941 | 5/1977 | Miller | 55/169 |

FOREIGN PATENT DOCUMENTS

| 767018 | 9/1980 | U.S.S.R. |
| 1146852 | 7/1986 | U.S.S.R. |
| 902420 | 2/1961 | United Kingdom. |

OTHER PUBLICATIONS

Derwent's abstract, No. 85–30 523/05, SU 1 101 259, Jul. 7, 1984.

Patent Abstracts of Japan, vol. 7, No. 252, C194, abstract of JP 58–139709, publ Aug. 19, 1983 (Doryokuro Kakunenroy Kaihatsu Jigyodan).

Patent Abstracts of Japan, vol. 13, No. 227, C600, abstract of JP 01–38107, publ Feb. 8, 1989 (Kanzaki Paper Mfg Co Ltd).

Primary Examiner—A. Michael Chambers
Attorney, Agent, or Firm—Ronald P. Kananen

[57] ABSTRACT

The present invention relates to a fluid reservoir, chiefly a reservoir whose purpose is to constitute a buffer, wherein the liquid level varies substantially comprising an inlet conduit (1) for liquid, an outlet conduit (2) for liquid, reservoir walls (3), a reservoir bottom (4) and a liquid outflow arrangement (5) located inside the said reservoir, which is connected to the said inlet conduit (2), the said outflow arrangement (5) comprising means (6) to ensure that its opening (7) follows the surface of the liquid (8) in the said reservoir (3, 4), the opening (7) preferably being located so that it discharges on a level with or immediately below the said liquid surface, which significantly reduces the risk that gas is included in the liquid flowing out via the outlet conduit.

19 Claims, 4 Drawing Sheets

LIQUID RESERVOIR

This application is a continuation of application Ser. No. 08/232,026 filed as PCT/SE92/00744, Oct. 28, 1992, published as WO93/09059, May 13, 1993.

BACKGROUND

The present invention relates to a liquid reservoir, whose purpose is to provide a buffer for foaming-susceptible spent liquor and in which the level of liquid varies significantly. The main purpose of the invention is to reduce the risk that gas accompanies the liquid that is withdrawn from the reservoir.

PRIOR ART AND PROBLEMS

The problem which the invention is intended to solve is found for example in connection with cistern constellations containing cyclone separators. In a known cistern constellation of this type the cyclone separator is secured to the bottom of it. The liquid levels in such systems vary considerably, and at high level the gas bubbles in the incoming liquid/gas mixture are exposed to a static pressure as a result of which the bubbles become compressed. It is generally known that small gas bubbles rise significantly more slowly towards a liquid surface than larger bubbles, quite simply because small bubbles have a less favourable ratio between volume and cross-section than larger bubbles. It follows from this that at higher levels in liquid cisterns the residual gas which leaves the cyclone separator near the bottom of the cistern will rise so slowly towards the surface that one instead runs the risk that it will be drawn down towards the tank's outlet.

For the same reason, the centrifugal separation in the cyclone separator will naturally itself be impaired at increased static pressure. The separation mechanism for liquid/gas mixture is the same in a cyclone as that which takes place in a tank.

Another situation where problems can arise with gas being present in the liquid that is drawn from a reservoir is when the outflow from the inlet conduit is arranged relatively high up in the reservoir at the same time as the level of liquid is relatively low. This results in the gas being drawn down in the liquid stream that is falling into the liquid bath, which consequently can result in gas being drawn off together with the liquid that is being removed from the reservoir.

SOLUTIONS AND ADVANTAGES

An objective of the invention is at least to reduce the abovementioned problems, which objective is achieved by means of a liquid reservoir, the purpose of which is to provide a buffer for foaming-susceptible spent liquor from the cellulose industry, wherein the liquid level varies substantially, comprising an inlet conduit for liquid, an outlet conduit for liquid, reservoir walls, a reservoir bottom and a liquid outflow arrangement, located inside the said reservoir, that is connected to the said inlet conduit, wherein the said outflow arrangement comprises means for ensuring that its opening follows the level of liquid in the reservoir, wherein the opening is preferably arranged so that it opens at the level of or immediately below the stated liquid surface.

Floating outflow arrangement in liquid reservoirs are indeed known. Thus, through SU-767 018, a liquid reservoir is already known that comprises an inlet conduit for liquid, an outlet conduit for liquid, reservoir walls, a reservoir bottom and a liquid outflow arrangement inside the reservoir that is connected with the inlet conduit, wherein the outlet arrangement comprises means for ensuring that its opening follows the liquid level in the said reservoir. However, this known arrangement differs substantially from the invention, which envisages a buffer reservoir for foaming-susceptible spent liquor from the cellulose industry, wherein the liquid level varies substantially and wherein the outflow arrangement also comprises liquid/gas segregating means in the form of a cyclone separator.

With an arrangement according to the invention, any gas bubbles in the incoming liquid/gas mixture are always exposed, in connection with the outflow in the reservoir, to a low or non-existent static pressure, which results in a liquid reservoir from which liquid can be drawn that is free from gas content.

The presence of the centrifugal separator at the outflow inside the reservoir means that with the present invention the advantage is also gained that the centrifugal separation itself takes place under optimum conditions, i.e. with the least possible influence of static pressure. Furthermore, any residual gas which flows out from the separator together with the liquid has the shortest possible distance to the surface, at the same time as the rate of ascent of the gas is optimum.

In certain liquids which are to be stored in cisterns solid particles or fibres are present which can float with gas bubbles to the surface and form a cake there. This cake in turn effectively prevents residual gases from reaching the surface.

A further advantage with the present invention is that since all liquid outflow occurs in the surface layer, the formation of such a cake is counteracted. This is achieved partly because the flotation effect is minimal since the bubbles have a very short distance to the surface, partly through the turbulence effect which takes place in the surface layer and thereby releases any microbubbles which are sticking to the particles/fibres. As a result the bubbles come in contact with the liquid surface and burst, while particles/fibres sink and follow along with the outgoing liquid flow.

SHORT DESCRIPTION OF THE FIGURES

In the test which follows, the invention will be described in more detail with reference to the attached drawings, in which:

FIG. 1: shows a preferred embodiment of a liquid reservoir with an outflow arrangement according to the invention, seen from the side, FIG. 2: shows the same reservoir seen from above, FIG. 3: shows an enlargement of the part of the outflow arrangement according to FIG. 2 that is located upstream, FIG. 4: shows an enlargement of the part of the outflow arrangement according to FIG. 2 that is located downstream, FIG. 5: shows an alternative embodiment of an outflow arrangement according to the invention, FIG. 6: shows a selected part of the last-named embodiment, FIG. 7: shows a side view of an alternative embodiment of the part of an outflow arrangement according to FIG. 1–4 that is located upstream, and FIG. 8: shows a horizontal cross-section of the last-named part.

DETAILED DESCRIPTION

Figure 1:
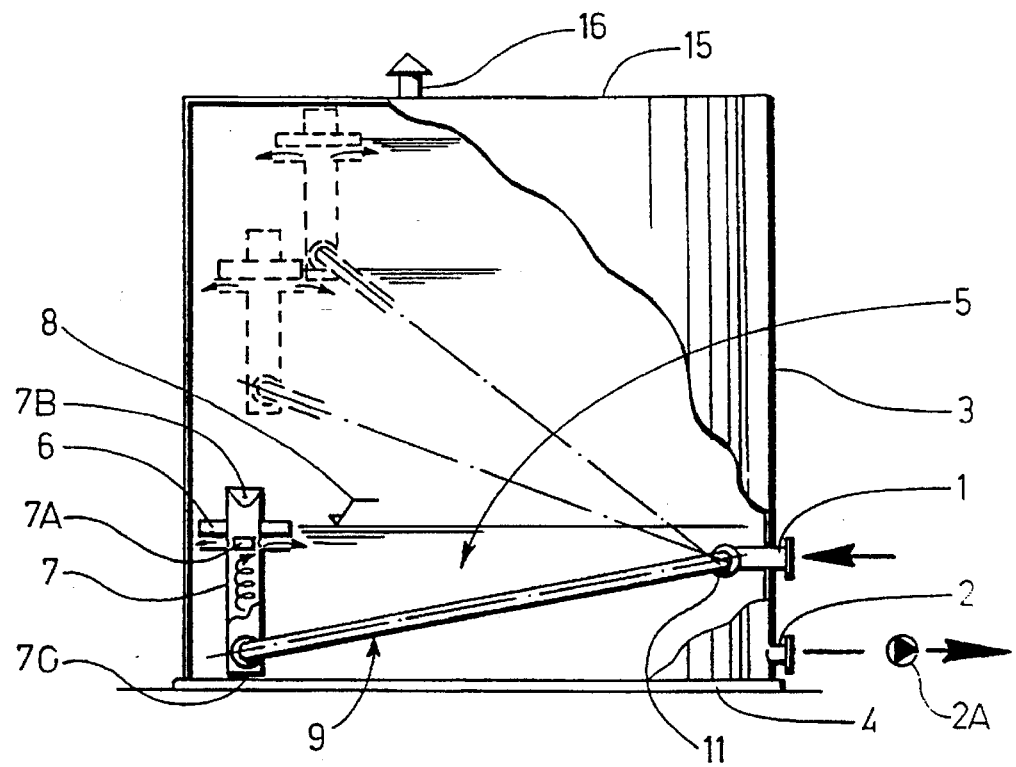

In FIG. 1 is shown a liquid reservoir of the cistern type, i.e. with substantial storage capacity amounting to several cubic meters. The reservoir, which is constructed in a manner which is preferred for the invention, stands erected on the ground and comprises a bottom 4, cylindrical walls 3 and a cover 15. Liquid is conducted to the reservoir via an inlet conduit 1 and is drawn off the reservoir via an outlet conduit 2 preferably with the aid of a pump 2A. An outflow arrangement 5 according to the invention ensures that the liquid outflow in the reservoir always takes place in the vicinity of the liquid surface 8. At a pivot point 11, a rigid conduit pipe, which is movable in a vertical direction, is attached to the inlet conduit I for the liquid. The other end of the movable conduit pipe (downstream) is connected to a cyclone separator 7, which connection is also arranged flexibly, in the same way as the attachment 11 to the inlet conduit 1. The cyclone separator 7 is constructed in the form of an elongated cylindrical tube with an upper, open end 7B for gas release and a lower end 7C, which is fitted with a bottom plate in which there is only a smallish drainage hole (not shown). The liquid flowing up through the cyclone is intended to flow out through several openings 7A, which are placed one after the other in a horizontal plane, each opening 7A having a length in the peripheral direction which is greater than that in the axial direction.

Immediately above the openings 7A is placed a liquid-displacing body 6, which gives the whole outflow arrangement 5 sufficient buoyancy to allow it to follow the surface 8 of the liquid. The openings 7A will thus always be located immediately under the said liquid surface 8, so that the possible gas remaining in the liquid flowing out of the slits 7A is exposed to a static pressure which is virtually zero. The gas that has been separated off, as well as the gas fluxes which arise as a result of the fluctuating level of the liquid, can flow through a ventilation arrangement 7B that is located in the top.

As liquid flows in through the inlet conduit 1 and further through the conduit part 9, which is movable vertically, flows out into the cyclone separator 7, in order finally to flow out through the openings 7A, liquid will be added to the existing liquid bath. If the inflow of liquid is greater than the amount which is drawn off via the outlet conduit 2, the water surface 8 will rise, at which juncture the float 6 will be caused to accompany the rising liquid surface, which will therefore take the cyclone separator 7 with it, with the result that the water flowing out will always discharge in the vicinity of the liquid surface 8.

With the aid of dashed-line markings, two exemplifying cases are shown, one where the water surface is located immediately above the half-way mark in the reservoir, and one where the outflow arrangement is located at its extreme upper position, that is physically prevented from moving upwards. The reason why the cyclone separator is fitted with a tubular section that extends a significant distance (ca. 20% of the total length) above the water surface 8 is that in this way water is prevented from splashing out at the cyclone separator's upper end 7B. This effect is magnified by the fact that the tube 7 is fitted with inwardly-directed flanges at its upper end 7B. The gas that is separated off by centrifugation leaves the cyclone separator meainly near the centre of the separator's upper part 7B.

Figure 2:
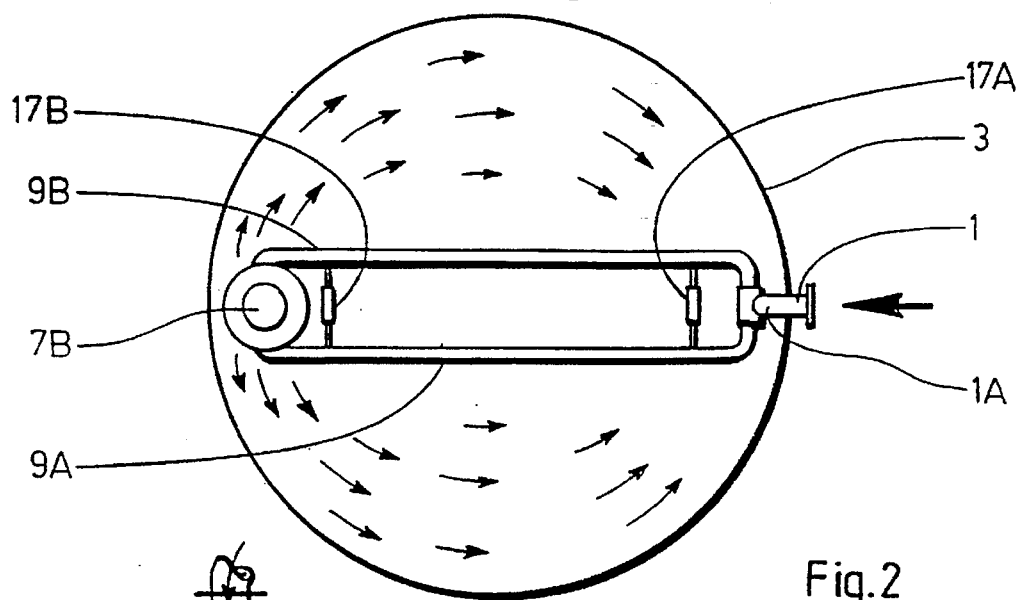

In FIG. 2 the reservoir is shown in a view from above and it can be seen that the movable conduit part 9 consists of two rigid parallel conduit parts 9A, 9B. The reason for using two parallel conduits is that one can thereby in a simple manner balance out reaction forces which otherwise could cause problems at pivot points etc. At the end of the inlet conduit X is arranged a T-shaped pipe 1A, inside which the upstream ends of the movable conduit part 9A and 9B are inserted, in order to function as pivot point 11. The same principle is also applied at the other end of the flexible pipes 9A, 9B, i.e. the respective conduit ends are each inserted into one of two concentrically arranged tubes 7D that point in opposite directions. In order to hold together the two conduit parts 9A, 9B there are two adjustable struts 17A, 17B fixed in the vicinity of each end.

Figure 3:
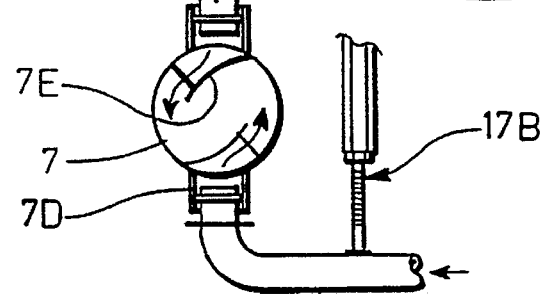

As shown in FIG. 3, two symmetrical elements 7E are arranged opposite each other inside the cyclone separator 7 in order to redirect the inflowing liquid from the two conduit pipes 9A, 9B tangentially, so that the required separating effect is achieved with the aid of the centrifugal force. These elements 7E are furthermore directed obliquely upwards so that the flow is not disturbed by the respective element 7E situated opposite.

Figure 4:
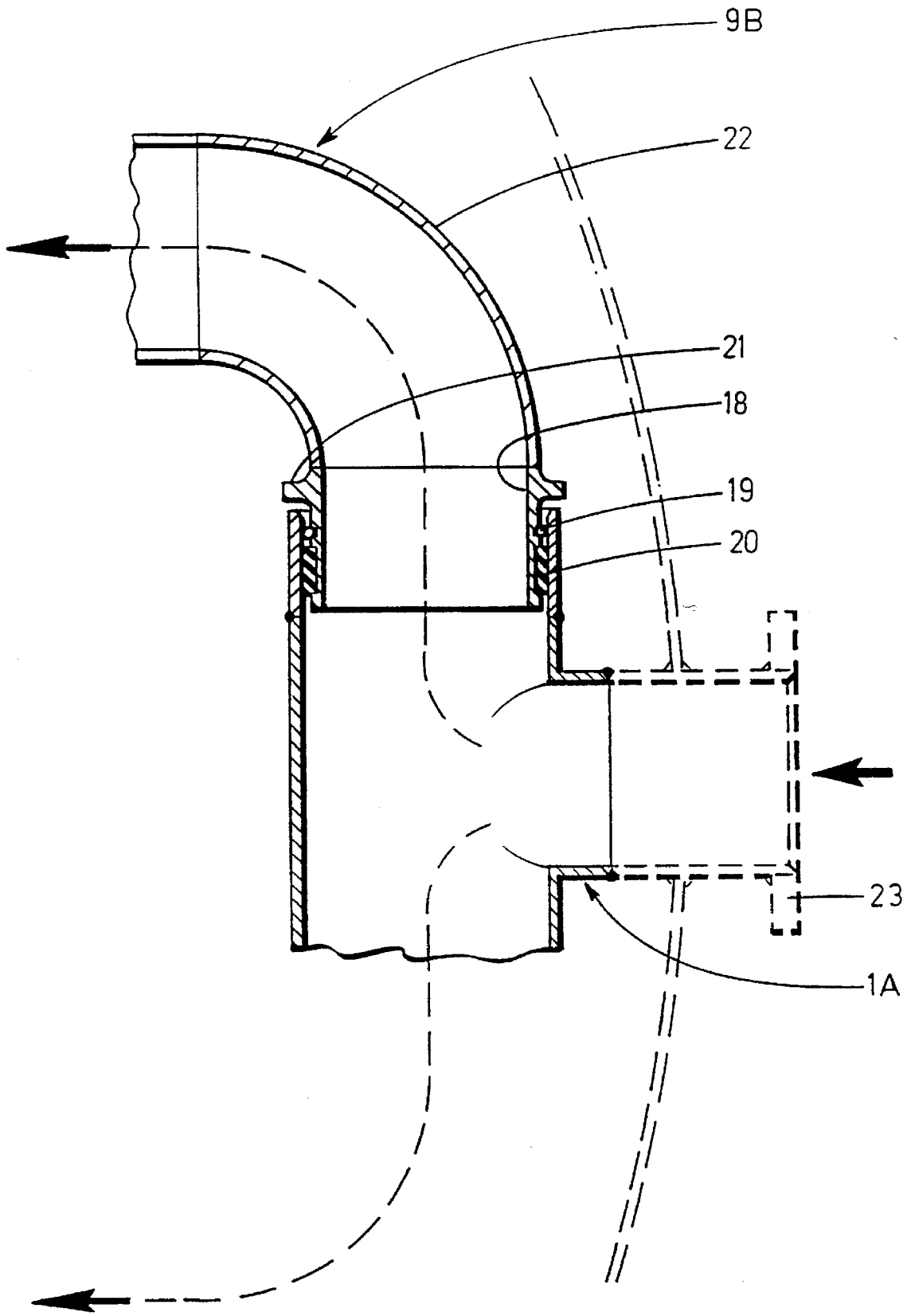

FIG. 4 shows a preferred detailed embodiment of the inlet part 1A in the reservoir, together with the part of the one conduit half 9B that is located upstream in this inlet part 1A. It can be seen here that the movable conduit is preferably made of a rigid, welded tube construction. The pivot element itself thus comprises a sleeve 18, fixed to the pipe bend, which is inserted inside one end of the T-pipe 1A. A projecting collar 21 forms an end stop and a slide bearing 20 is located inside a sealing element 19. The inlet pipe 1 (not shown) is designed to be fixed with the aid of bolt connections to a flange 23 on the T-pipe 1A.

Figures 5, 6:
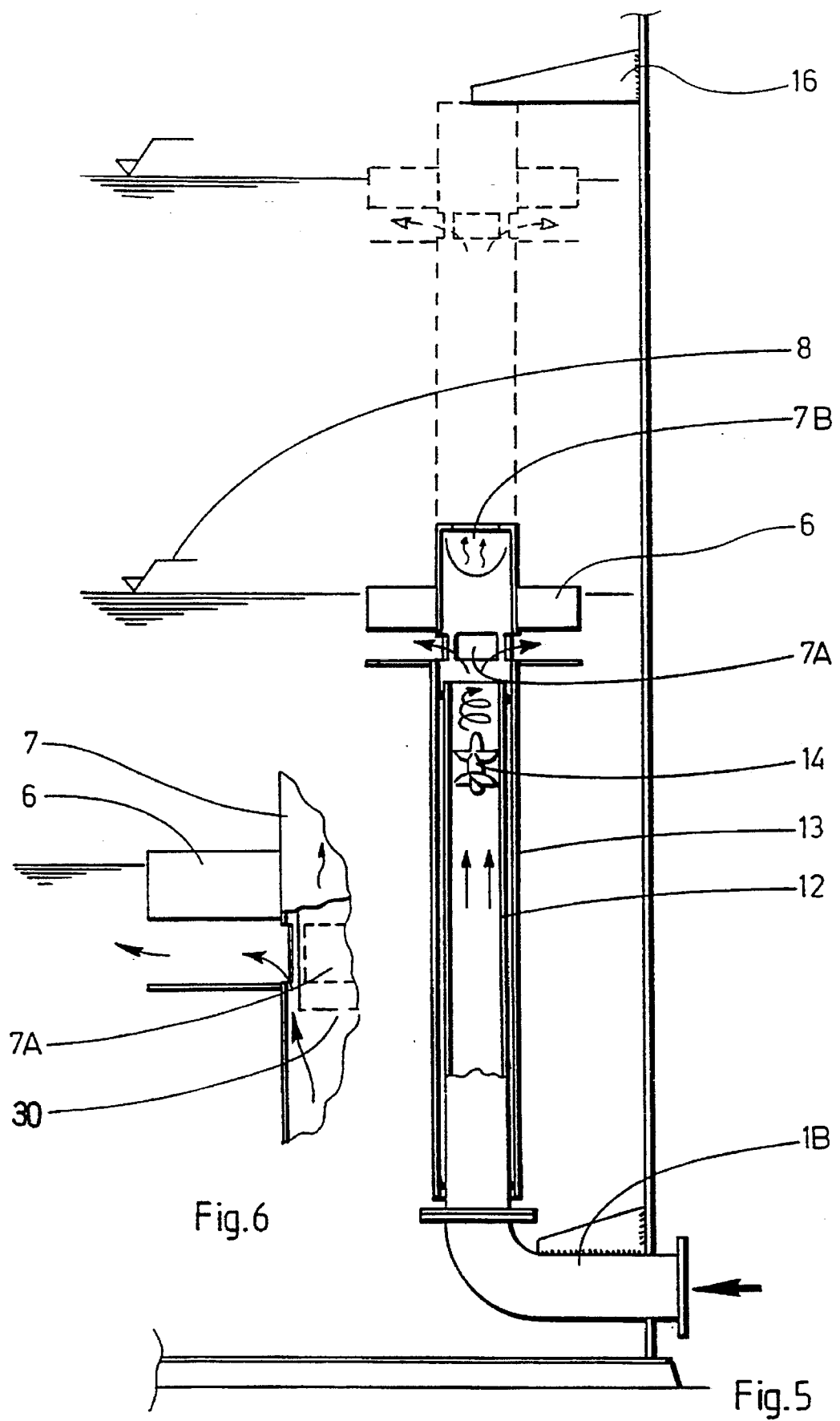

In FIG. 5 is shown an alternative embodiment of an outflow arrangement 5 according to the invention. According to this embodiment, the outflow arrangement consists of two telescopically displaceable parts 12, 13. The lower part 12 is fixed inside the reservoir 3 by being bolted to a connecting pipe 1B to the inlet conduit 1 (not shown). Outside this lower tube 12, which extends vertically upwards, is fitted a movable pipe 13 of larger diameter. A float 6 is attached to the upper end of this pipe and immediately below this float are the openings 7A for the out-flowing liquid. Thus these openings 7A will always be located immediately below the liquid surface 8. In the preferred case, a secured propeller-like arrangement 14 is located inside the fixed tube 12 with the purpose of setting the incoming medium into rotary motion. A projecting stay 16 provides an upper limit to the range of movement of the outflow arrangement. FIG. 6 shows a selected part of the cyclone separator 7. A cylindrical baffle 30 located inside the cyclone 7 and near the wall of the same adjacent the liquor outlets 7A and extending beyond the upper and lower rims of these outlets, serves to improve the centrifugal separation by preventing gas bubbles rotating near the center of the cyclone to follow the liquor out through the openings 7A.

Figure 7:
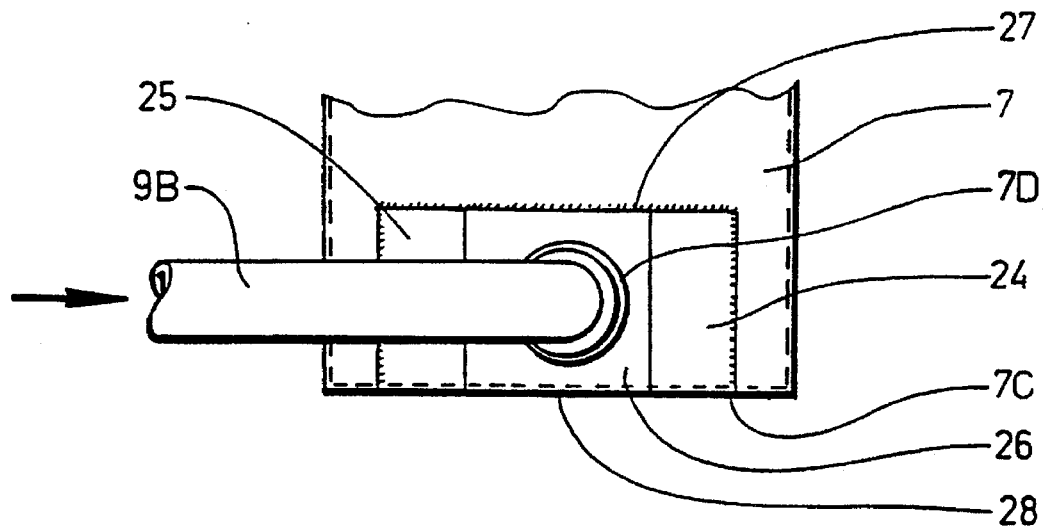
Figure 8:
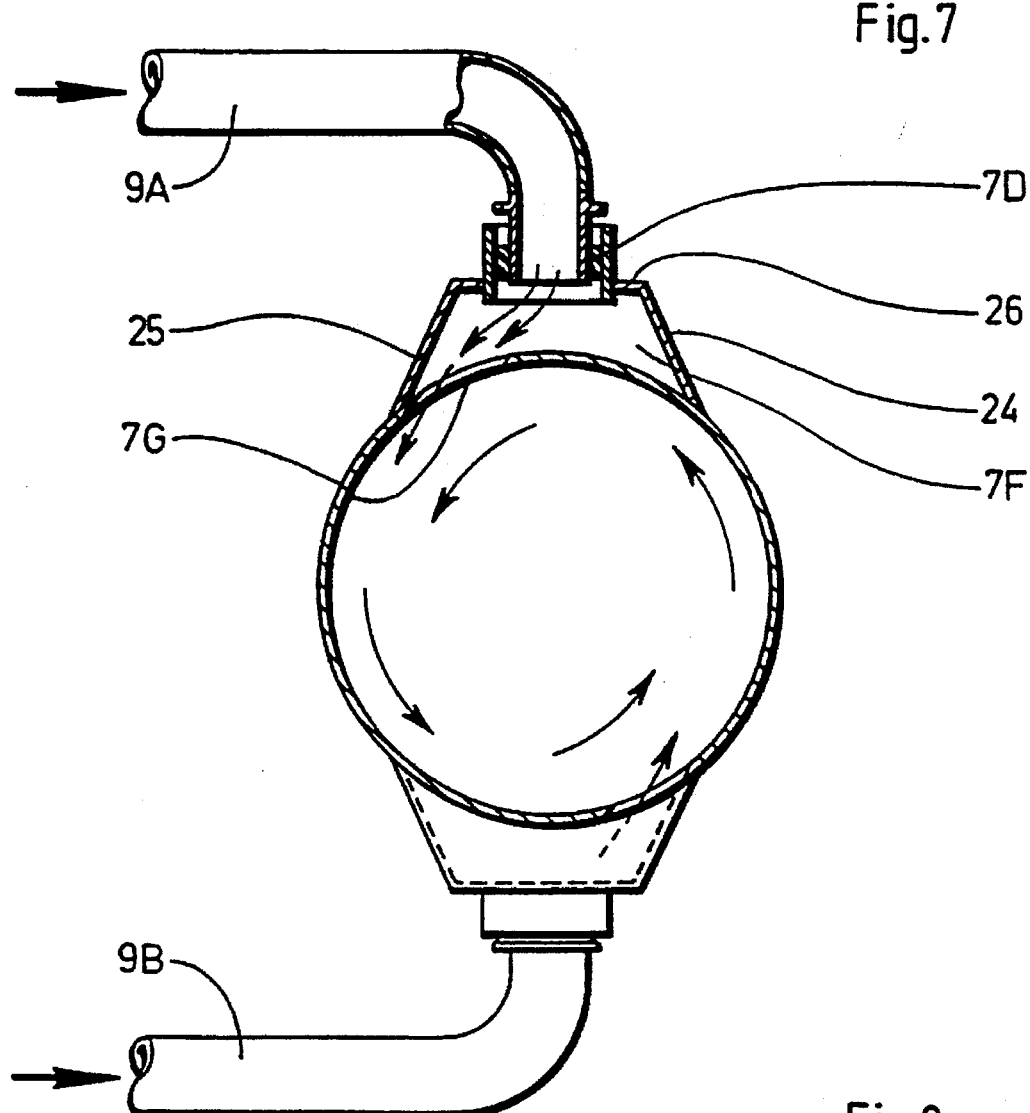

In FIGS. 7 and 8 are shown an alternative embodiment regarding the fastening of conduits 9A, 9B to the cyclone separator 7. With the aim of obtaining a relatively undisturbed inflow into the cyclone 7, the two conduits 9 each open into a form of antechamber 7F, comprising two side plates, 24, 25, which are arranged tangentially in relation to the pipe 7, between which are located a connecting plate 26 as well as top and bottom plates, 27 and 28, respectively. On the connecting plate 26 is located the pipe piece 7D into which the end of the conduits 9A, 9B are inserted. By arranging a vertically orientated slit 7G in the pipe 7 in the one corner of each antechamber 7F, the desired inflow conditions are achieved for the liquid that is being conveyed to the cyclone 7.

The invention is not limited by that which has been shown above but can be varied within the bounds of the subsequent patent claims. Thus it is possible, for example, instead of using a float 6, to affect the position of the opening 7A/openings with the aid, for example, of an hydraulic piston, pinion wheel and rack, chain and sprocket wheel drive, etc., indication of the level being obtained either with the aid of a small float or by means of a static pressure sensor, and regulation of the level being conveniently achieved electronically.

The rigid conduit 9 that was shown according to the first embodiment can be exchanged for a flexible conduit, in which case this solution also becomes applicable to reservoirs of smaller diameter. It is further conceivable that the conduit 9 itself can be arranged telescopically. The invention is mainly intended to be used in connection with foaming-susceptible liquids, of the nature of spent liquor, which are obtained after pulping and further processing of paper pulp, but the arrangement can, of course, conveniently be used in connection With any other liquid whatsoever where the problems as described occur. It will be further evident to the expert that the invention can also be used in connection with open reservoirs and that it can additionally be applied to other than actual reservoirs if it is possible to make use of an arrangement according to the invention, i.e. for example the inflow section at the upper part of a larger casing unit, where, for example, the inflow section itself constitutes a buffer zone for subsequent processing steps within the casing unit.

I claim:

1. Liquid reservoir apparatus, comprising:

a liquid reservoir having an inlet conduit (1) for liquid, an outlet conduit (2) for liquid, reservoir walls (3), and a reservoir bottom (4); and a liquid outflow arrangement (5), located inside said reservoir, that is connected to said inlet conduit (1), said outflow arrangement (5) comprising means (6) for ensuring that an outlet opening of said outflow arrangement (7A) follows the surface of the liquid (8) in said reservoir (3, 4);

wherein said reservoir apparatus provides a means for buffering a foaming-susceptible spent liquor from a cellulose industry, wherein a liquid level within said reservoir varies significantly and said outflow arrangement (5) also comprises a liquid/gas separating means (7) in the form of a cyclone separator for separating gas from liquid adjacent said outlet opening, said cyclone separator being submerged in the liquid in the reservoir and having motion means (7E) adjacent an inflow of the cyclone separator for applying a centrifugal force to the liquid entering the cyclone separator, and at least one opening located at an upper portion of said cyclone separator for allowing gas which has been separated from the liquid by centrifugal force in the cyclone separator to escape upwards.

2. The liquid reservoir apparatus according to claim 1, characterised in that the outlet opening (7A) is arranged so that it opens on a level with or immediately below said liquid surface, so that the centrifugal separator operates at essentially optimum conditions.

3. The liquid reservoir apparatus according to claim 1, characterised in that between the said outflow arrangement (5) and an attachment point (11) for the inlet conduit (1) is located a conduit part (9) that is movable at least in the vertical direction.

4. The liquid reservoir apparatus according to claim 3, characterised in that the said conduit part (9) comprises an essentially rigid pipe which at least at said attachment point (11) is flexibly connected to said inlet conduit (1).

5. The liquid reservoir apparatus according to claim 4, characterised in that said conduit part comprises two conduits that are arranged so that reaction forces arising from the flowing liquid are essentially balanced out.

6. The liquid reservoir apparatus according to claim 1, characterised in that said means (6) for ensuring that the outlet opening follows the surface of the liquid comprises a fluid-displacing body (6) connected to the opening (7A) and which exercises a net lift on said outflow arrangement.

7. The liquid reservoir apparatus according to claim 1, characterised in that between said outflow arrangement (5) and said inlet conduit (1) there is a telescopically movable, sealed, device (12,13).

8. The liquid reservoir apparatus according to claim 7, characterised in that said device (12, 13) comprises a lower portion (12), which is fixed within said casing and to which said inlet conduit (1) extends and opens up within, and an upper portion (13) which is slidably arranged in relation to said baseportion (12) and that said upper portion contains the outlet opening of said outflow arrangement (5).

9. Apparatus for handling foaming susceptible spent liquor in a cellulose industry, comprising:

a reservoir (3) accommodating a volume of said liquor, said reservoir comprising a bottom (4), walls (3), and a top (15) and constituting a buffer for said spent foaming-susceptible liquor;

wherein a level of a liquid surface (8) varies significantly in said reservoir, the reservoir also comprising at least one inlet conduit (1) for conducting said spent foaming-susceptible liquor to the reservoir via a liquid/gas separating means (7), said separating means being provided in the reservoir for separating gas from the liquid conducted through said inlet conduit, and an outlet conduit (2) for drawing off liquid from the reservoir;

wherein said liquid/gas separating means is a cyclone separator (7) comprising a rotationally symmetrical body portion submerged in the liquid in the reservoir, motion means (7E) adjacent the inflow into the submerged rotationally symmetrical body portion for applying a centrifugal force to the liquid entering the rotationally symmetrical body portion of said cyclone separator, and at least one opening (7A, 7B) located at an upper portion of said rotationally symmetrical body portion for directing liquid to flow out in radial directions and allowing gas which has been separated from the liquid by centrifugal force in the cyclone separator to escape upwards; and means for moving the cyclone separator to vertically follow the surface (8) of the liquid in the reservoir.

10. Apparatus according to claim 9, wherein said means for moving the cyclone separator comprises a liquid-displacing body which gives the cyclone separator and other means attached to the cyclone separator a sufficient buoyancy to allow the cyclone separator to follow the surface (8) of the liquid in the reservoir.

11. Apparatus according to claim 9, wherein said motion means are disposed inside said rotationally symmetrical body portion, said motion means being non-rotating.

12. Apparatus according to claim 11, wherein the liquid conducted to said liquid/gas separating means enters the rotationally symmetrical body portion horizontally at the bottom of the rotationally symmetrical body portion, wherein the inflowing liquid is directed tangentially by said non-rotating motion means (7E) for the achievement of said centrifugal force.

13. Apparatus according to claim 11, wherein said submerged rotationally symmetrical body portion accommodates said non-rotating motion means so that said motion means extend from a lower level adjacent the region where the liquid enters the cyclone separator to an upper level below the liquid surface.

14. Apparatus according to claim 9, wherein two parallel and rigid conduits (9) extend from said inlet conduit to said cyclone separator, said parallel conduits at their terminating ends turn towards the cyclone separator and enter the cyclone separator laterally and opposite to each other at the bottom of said rotationally symmetrical body portion.

15. Apparatus according to claim 14, wherein said non-rotating motion means are provided in the bottom part of said rotationally symmetrical body portion between said terminating ends of said conduits entering the body portion laterally and opposite to each other.

16. Apparatus according to claim 15, wherein said parallel conduits are pivotally connected to said inlet conduit and to the bottom part of said rotationally symmetrical body portion.

17. Apparatus according to claim 9, wherein a ventilation arrangement (16) is located in the top of the reservoir, through which the gas that has been separated off by the cyclone separator, as well as the gas fluxes which arise as a result of the fluctuating level of the liquid, can flow.

18. Apparatus according to claim 9, wherein said rotationally symmetric body portion is cylindrical.

19. Apparatus according to claim 9, wherein said outlet conduit (2) for drawing off liquid from the reservoir is positioned adjacent to the bottom of the reservoir.

* * * * *